United States Patent
Sinha et al.

(10) Patent No.: US 12,450,180 B2
(45) Date of Patent: Oct. 21, 2025

(54) MEMORY COMMANDS FOR MULTI-HOST COMMUNICATIONS

(71) Applicant: Micron Technology, Inc., Boise, ID (US)

(72) Inventors: Gaurav Sinha, Oberschleißheim (DE); Marco Redaelli, Munich (DE)

(73) Assignee: Micron Technology, Inc., Boise, ID (US)

( * ) Notice: Subject to any disclaimer, the term of this patent is extended or adjusted under 35 U.S.C. 154(b) by 57 days.

(21) Appl. No.: 18/521,373

(22) Filed: Nov. 28, 2023

(65) Prior Publication Data

US 2024/0184722 A1 Jun. 6, 2024

Related U.S. Application Data

(60) Provisional application No. 63/385,738, filed on Dec. 1, 2022.

(51) Int. Cl.
*G06F 13/16* (2006.01)
(52) U.S. Cl.
CPC ................................ *G06F 13/1668* (2013.01)
(58) Field of Classification Search
None
See application file for complete search history.

(56) References Cited

U.S. PATENT DOCUMENTS

| | | | | |
|---|---|---|---|---|
| 10,509,753 | B2* | 12/2019 | Duncan | G06F 9/45558 |
| 11,467,776 | B1* | 10/2022 | Chang | G06F 3/061 |
| 2015/0304423 | A1* | 10/2015 | Satoyama | H04L 67/1097 709/223 |
| 2018/0253398 | A1* | 9/2018 | Wu | G06F 15/173 |
| 2019/0041936 | A1* | 2/2019 | Teoh | G06F 1/266 |
| 2020/0319812 | A1* | 10/2020 | He | G06F 3/0665 |
| 2022/0276809 | A1* | 9/2022 | Guy | G06F 3/0604 |
| 2023/0051825 | A1* | 2/2023 | Chang | G06F 3/0688 |

* cited by examiner

*Primary Examiner* — Michael Sun
(74) *Attorney, Agent, or Firm* — Harrity & Harrity, LLP

(57) ABSTRACT

Implementations described herein relate to a memory device that enables communication between multiple connected host devices. In some implementations, a memory device may receive, from a first host device in communication with the memory device, a send communication command instructing the memory device to transmit data from the first host device to at least a second host device in communication with the memory device. The memory device may receive, from the second host device, a receive communication command instructing the memory device to transmit data to the second host device from at least the first host device. The memory device may transmit a message from the first host device to the second host device based on the send communication command and the receive communication command.

20 Claims, 9 Drawing Sheets

MEMORY COMMANDS FOR MULTI-HOST COMMUNICATIONS

CROSS REFERENCE TO RELATED APPLICATION

This Patent Application claims priority to U.S. Provisional Patent Application No. 63/385,738, filed on Dec. 1, 2022, and entitled "MEMORY COMMANDS FOR MULTI-HOST COMMUNICATIONS." The disclosure of the prior Application is considered part of and is incorporated by reference into this Patent Application.

TECHNICAL FIELD

The present disclosure generally relates to memory devices, memory device operations, and, for example, to memory commands for multi-host communications.

BACKGROUND

Memory devices are widely used to store information in various electronic devices. A memory device includes memory cells. A memory cell is an electronic circuit capable of being programmed to a data state of two or more data states. For example, a memory cell may be programmed to a data state that represents a single binary value, often denoted by a binary "1" or a binary "0." As another example, a memory cell may be programmed to a data state that represents a fractional value (e.g., 0.5, 1.5, or the like). To store information, an electronic device may write to, or program, a set of memory cells. To access the stored information, the electronic device may read, or sense, the stored state from the set of memory cells.

Various types of memory devices exist, including random access memory (RAM), read only memory (ROM), dynamic RAM (DRAM), static RAM (SRAM), synchronous dynamic RAM (SDRAM), ferroelectric RAM (FeRAM), magnetic RAM (MRAM), resistive RAM (RRAM), holographic RAM (HRAM), flash memory (e.g., NAND memory and NOR memory), and others. A memory device may be volatile or non-volatile. Non-volatile memory (e.g., flash memory) can store data for extended periods of time even in the absence of an external power source. Volatile memory (e.g., DRAM) may lose stored data over time unless the volatile memory is refreshed by a power source. In some examples, a memory device may include one or more ports configured to communicate with one or more host devices, which may be one or more physical host devices and/or one or more virtual host devices. In some examples, a memory device may be configured to communicate with multiple host devices, and the memory device may include a shared memory (e.g., a shared namespace) accessible by the multiple host devices. In such examples, the multiple host devices may communicate with one another, which is sometimes referred to herein as "multi-host communications."

DETAILED DESCRIPTION

Figure 1:
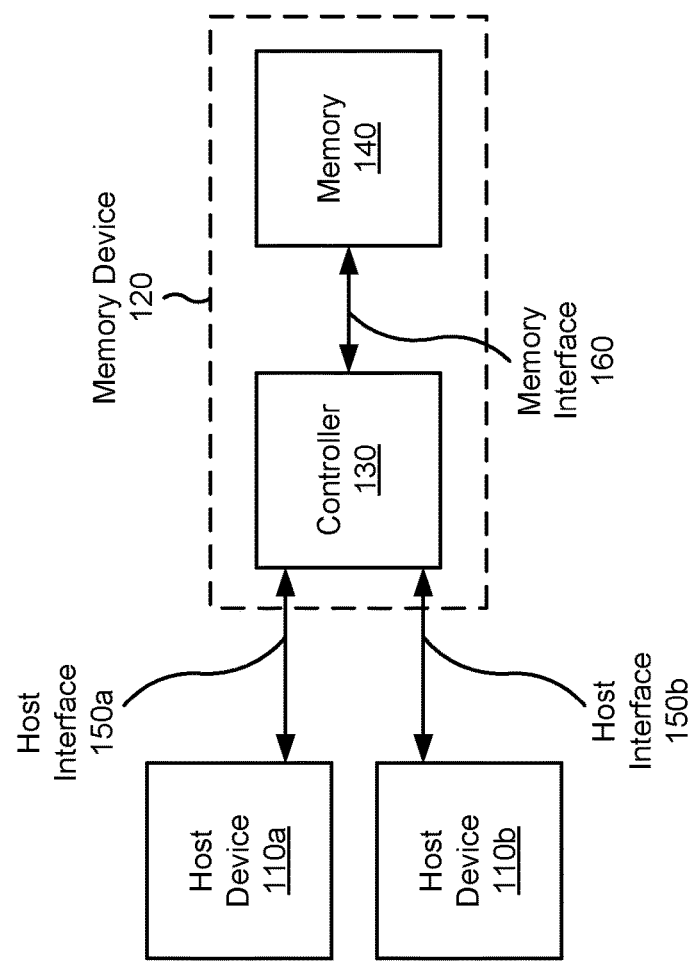
FIG. 1 is a diagram illustrating an example system capable of implementing memory commands for multi-host communications.

Certain memory devices may be associated with a centralized storage accessible by multiple connected host devices. For example, certain automotive applications, such as in-vehicle infotainment (IVI) systems, graphic instrument cluster (GIC) systems, advanced driver assistance systems (ADAS), or similar automotive systems may be associated with a centralized storage to enable data sharing among the various connected host devices. In such applications, the memory device may include a shared namespace accessible by the host devices connected to different port of the memory device and/or multiple virtual machines on each port of the memory device using single root input/output virtualization (SR-IOV).

In order to manage a centralized storage accessible by multiple connected host devices, a memory device may employ a file sharing system, such as a global file system 2 (GFS2) or a similar file sharing system. Such file sharing systems may permit various connected host devices to have direct concurrent access to the centralized storage. To avoid conflicts that may otherwise arise by the various host devices concurrently accessing the shared storage space, the file sharing system may require communication among the various host devices. For example, the various host devices may communicate with one another via a transmission control protocol/internet protocol (TCP/IP) interface to coordinate access to the centralized storage. For certain applications, such as automotive applications or other mobile applications, a TCP/IP connection (e.g., an internet connection) may not always been available to the various host devices, resulting in unreliable multi-host communications and thus uncoordinated access to shared memory locations. Moreover, TCP/IP communications between the various host devices may not be practical for certain applications due to hardware constraints, power, computing, and memory resource constraints, network drops, or other limitations. Accordingly, communications among various host devices connected to a centralized storage may be unreliable and/or unavailable, resulting in uncoordinated concurrent access of the centralized storage and thus error-prone memory devices.

Some implementations described herein enable multi-host communication support via a memory device, such that multiple host devices connected to the memory device may communicate with one another even in the absence of a TCP/IP connection or other wireless link between the host devices. In some implementations, a memory device may be configured to receive, from multiple connected host devices, send communication commands and receive communication commands. A send communication command may instruct the memory device to read data (e.g., a message to be transmitted to one or more other host devices) from a buffer location associated with the sender host device, and a receive communication command may instruct the memory device to write data (e.g., a message to be received by one or more other host devices) to a buffer location associated with the receiver host device. In this regard, the memory device may support communication among the connected host devices by reading data (e.g., a message) from a buffer location associated with a sending host device in response to a send communication command transmitted by the sending host device, and writing the data (e.g., the message) to a buffer location associated with a receiving host device in response to a receive communication command transmitted by the receiving host device. As a result, various host devices connected to a centralized storage may communicate with one another even in the absence of a TCP/IP connection or similar communication link, resulting in coordinated reading and writing of the centralized storage and thus reduced errors associated with multi-host memory devices. These and other features of the multi-host memory devices described herein will become more apparent with reference to FIGS. 1-5, described in detail below.

FIG. 1 is a diagram illustrating an example system 100 capable of implementing memory commands for multi-host communications. The system 100 may include one or more devices, apparatuses, and/or components for performing operations described herein. For example, the system 100 may include one or more host devices 110 (shown as a first host device 110a and a second host device 110b) and a memory device 120. The memory device 120 may include a controller 130 and memory 140. The controller 130 and the memory 140 may communicate via a memory interface 160. Moreover, each host device 110 may communicate with the memory device 120 (e.g., the controller 130 of the memory device 120) via a respective host interface 150 (shown as a first host interface 150a and a second host interface 150b). In some examples, the memory device 120 may be a multi-port memory device, with each host interface 150 associated with a corresponding port of the memory device 120. In some other examples, multiple host interfaces 150 (e.g., the first host interface 150a and the second host interface 150b) may be associated with a same port of the memory device 120. For example, the memory device 120 may be a single root input/output virtualization (SR-IOV) memory device 120 in which multiple host devices 110 (e.g., the first host device 110a and the second host device 110b) communicate with the memory device 120 via a common port (sometimes referred to herein as an SR-IOV port).

The system 100 may be any electronic device configured to store data in memory. For example, the system 100 may be a computer, a mobile phone, a wired or wireless communication device, a network device, a server, a device in a data center, a device in a cloud computing environment, a vehicle (e.g., an automobile or an airplane), and/or an Internet of Things (IOT) device. In some examples, the system 100 may be associated with an advanced and/or centralized storage used in certain automotive applications, such as for use with an automotive IVI system, an automotive GIC system, an automotive ADAS, or a similar system.

The host devices 110 may include one or more processors configured to execute instructions and store data in the memory 140. For example, the host devices 110 may include a central processing unit (CPU), a graphics processing unit (GPU), a field-programmable gate array (FPGA), an application-specific integrated circuit (ASIC), and/or another type of processing component.

The memory device 120 may be any electronic device or apparatus configured to store data in memory. In some implementations, the memory device 120 may be an electronic device configured to store data persistently in non-volatile memory. For example, the memory device 120 may be a hard drive, a solid-state drive (SSD), a flash memory device (e.g., a NAND flash memory device or a NOR flash memory device), a universal serial bus (USB) thumb drive, a memory card (e.g., a secure digital (SD) card), a secondary storage device, a non-volatile memory express (NVMe) device, and/or an embedded multimedia card (eMMC) device. In this case, the memory 140 may include non-volatile memory configured to maintain stored data after the memory device 120 is powered off. For example, the memory 140 may include NAND memory or NOR memory. In some implementations, the memory 140 may include volatile memory that requires power to maintain stored data and that loses stored data after the memory device 120 is powered off, such as one or more latches and/or random-access memory (RAM), such as dynamic RAM (DRAM) and/or static RAM (SRAM). For example, the volatile memory may cache data read from or to be written to non-volatile memory, and/or may cache instructions to be executed by the controller 130.

The controller 130 may be any device configured to communicate with the host devices 110 (e.g., via the host interfaces 150) and the memory 140 (e.g., via the memory interface 160). Additionally, or alternatively, the controller 130 may be configured to control operations of the memory device 120 and/or the memory 140. For example, the controller 130 may include a memory controller, a system controller, an ASIC, an FPGA, a processor, a microcontroller, and/or one or more processing components. In some implementations, the controller 130 may be a high-level controller, which may communicate directly with the host devices 110 and may instruct one or more low-level controllers regarding memory operations to be performed in connection with the memory 140. In some implementations, the controller 130 may be a low-level controller, which may receive instructions regarding memory operations from a high-level controller that interfaces directly with the host devices 110. As an example, a high-level controller may be an SSD controller, and a low-level controller may be a non-volatile memory controller (e.g., a NAND controller) or a volatile memory controller (e.g., a DRAM controller). In some implementations, a set of operations described herein as being performed by the controller 130 may be performed by a single controller (e.g., the entire set of operations may be performed by a single high-level controller or a single low-level controller). Alternatively, a set of operations described herein as being performed by the controller 130 may be performed by more than one controller (e.g., a first subset of the operations may be performed by a high-level controller and a second subset of the operations may be performed by a low-level controller).

The host interfaces 150 enable communication between the host devices 110 and the memory device 120. The host interfaces 150 may include, for example, a Small Computer System Interface (SCSI), a Serial-Attached SCSI (SAS), a Serial Advanced Technology Attachment (SATA) interface, a Peripheral Component Interconnect Express (PCIe) interface, an NVMe interface, a USB interface, a Universal Flash Storage (UFS) interface, an embedded multimedia card (eMMC) interface, and/or an SR-IOV interface.

The memory interface 160 enables communication between the memory device 120 and the memory 140. The memory interface 160 may include a non-volatile memory interface (e.g., for communicating with non-volatile memory), such as a NAND interface or a NOR interface. Additionally, or alternatively, the memory interface 160 may include a volatile memory interface (e.g., for communicating with volatile memory), such as a double data rate (DDR) interface.

In some implementations, the memory device 120 and/or the controller 130 may be configured to receive, from a first host device 110a in communication with the memory device 120, a send communication command instructing the memory device 120 to transmit data from the first host device 110a to at least a second host device 110b in communication with the memory device 120; receive, from the second host device 110b, a receive communication command instructing the memory device 120 to transmit data to the second host device 110b from at least the first host device 110a; and transmit a message from the first host device 110a to the second host device 110b based on the send communication command and the receive communication command.

In some implementations, the memory device 120, the controller 130, and/or the host devices 110 (e.g., the first host device 110a and/or the second host device 110b) may be configured to transmit, by the first host device 110a to the memory device 120, a send communication command instructing the memory device 120 to transmit data from the first host device 110a to at least a second host device 110b; transmit, by the second host device 110b to the memory device 120, a receive communication command instructing the memory device 120 to transmit data to the second host device 110b from at least the first host device 110a; and facilitate communication, by the memory device 120, between the first host device 110a and the second host device 110b by transmitting a message from the first host device 110a to the second host device 110b based on the send communication command and the receive communication command.

As indicated above, FIG. 1 is provided as an example. Other examples may differ from what is described with regard to FIG. 1.

Figure 2:
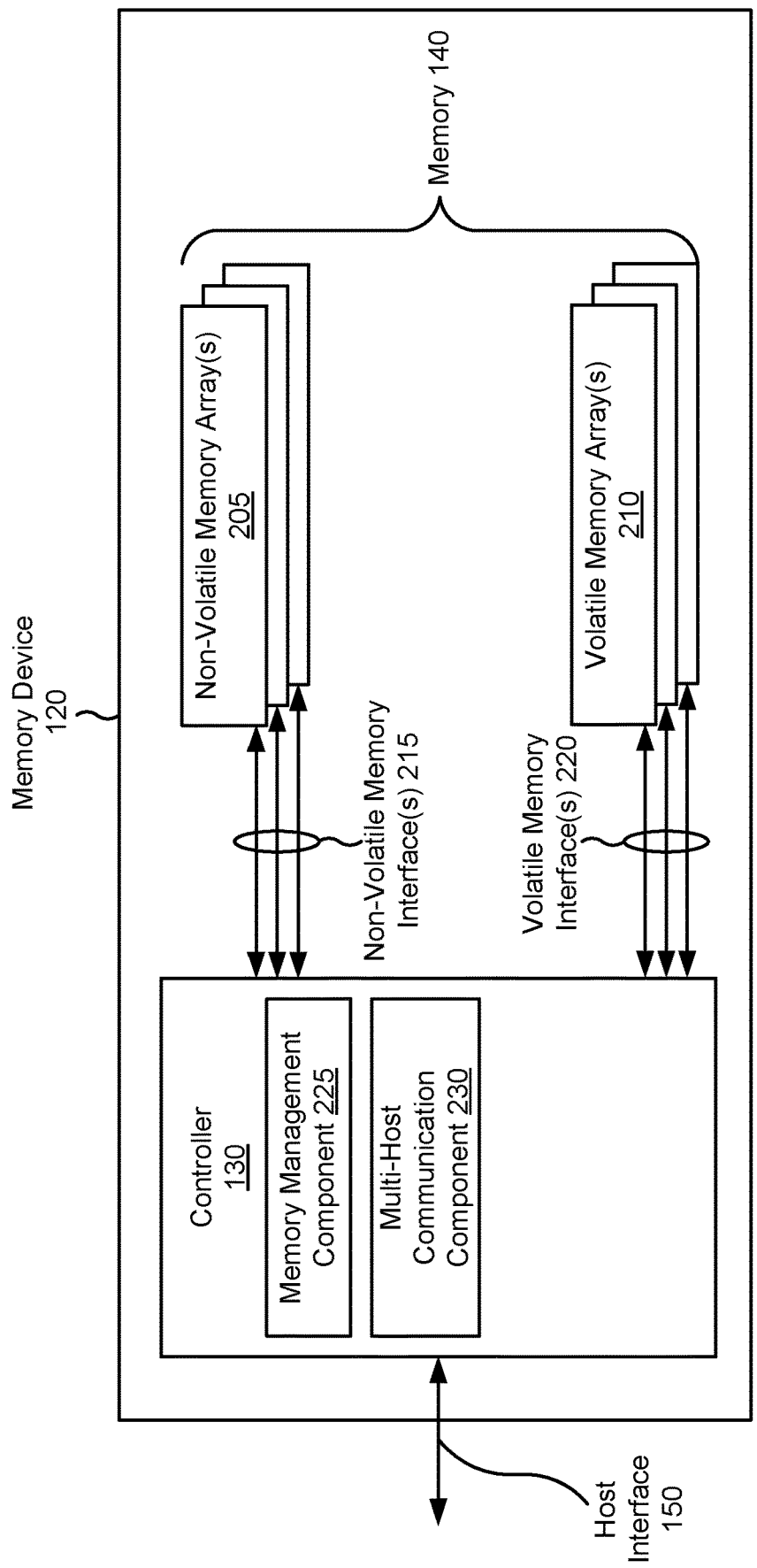
FIG. 2 is a diagram of example components included in a memory device.

FIG. 2 is a diagram of example components included in a memory device 120. As described above in connection with FIG. 1, the memory device 120 may include a controller 130 and memory 140. As shown in FIG. 2, the memory 140 may include one or more non-volatile memory arrays 205, such as one or more NAND memory arrays and/or one or more NOR memory arrays. Additionally, or alternatively, the memory 140 may include one or more volatile memory arrays 210, such as one or more SRAM arrays and/or one or more DRAM arrays. The controller 130 may transmit signals to and receive signals from a non-volatile memory array 205 using a non-volatile memory interface 215. The controller 130 may transmit signals to and receive signals from a volatile memory array 210 using a volatile memory interface 220.

The controller 130 may control operations of the memory 140, such as by executing one or more instructions. For example, the memory device 120 may store one or more instructions in the memory 140 as firmware, and the controller 130 may execute those one or more instructions. Additionally, or alternatively, the controller 130 may receive one or more instructions from the host devices 110 via the host interfaces 150, and may execute those one or more instructions. In some implementations, a non-transitory computer-readable medium (e.g., volatile memory and/or non-volatile memory) may store a set of instructions (e.g., one or more instructions or code) for execution by the controller 130. The controller 130 may execute the set of instructions to perform one or more operations or methods described herein. In some implementations, execution of the set of instructions, by the controller 130, causes the controller 130 and/or the memory device 120 to perform one or more operations or methods described herein. In some implementations, hardwired circuitry is used instead of or in combination with the one or more instructions to perform one or more operations or methods described herein. Additionally, or alternatively, the controller 130 and/or one or more components of the memory device 120 may be configured to perform one or more operations or methods described herein. An instruction is sometimes called a "command."

For example, the controller 130 may transmit signals to and/or receive signals from the memory 140 based on the one or more instructions received from a host device 110, such as to transfer data to (e.g., write or program), to transfer data from (e.g., read), to erase all or a portion of the memory 140 (e.g., one or more memory cells, pages, sub-blocks, blocks, or planes of the memory 140), to send a message to one or more other host devices 110, and/or to receive a message from one or more other host devices 110. Additionally, or alternatively, the controller 130 may be configured to control access to the memory 140 and/or to provide a translation layer between the host device 110 and the memory 140 (e.g., for mapping logical addresses to physical addresses of a memory array). In some implementations, the controller 130 may translate a host interface command (e.g., a command received from a host device 110) into a memory interface command (e.g., a command for performing an operation on a memory array).

As shown in FIG. 2, the controller 130 may include a memory management component 225 and/or a multi-host communication component 230. In some implementations, one or more of these components are implemented as one or more instructions (e.g., firmware) executed by the controller 130. Alternatively, one or more of these components may be implemented as dedicated integrated circuits distinct from the controller 130.

The memory management component 225 may be configured to manage performance of the memory device 120. For example, the memory management component 225 may perform wear leveling, bad block management, block retirement, read disturb management, and/or other memory management operations. In some implementations, the memory device 120 may store (e.g., in memory 140) one or more memory management tables. A memory management table may store information that may be used by or updated by the memory management component 225, such as information regarding memory block age, memory block erase count, and/or error information associated with a memory partition (e.g., a memory cell, a row of memory, a block of memory, or the like).

The multi-host communication component 230 may be configured to facilitate communication between host devices 110, such as between the first host device 110a and the second host device 110b. In some implementations, the multi-host communication component 230 may be configured to receive commands (e.g., NVMe commands) from the host devices 110 instructing the memory device 120 to transmit messages between the first host device 110a and the second host device 110b. For example, in some implementations, the multi-host communication component 230 may be configured to receive send communication commands instructing the memory device 120 to transmit data to another host device 110, and/or receive communication commands instructing the memory device 120 to receive data from another host device 110. The multi-host communication component 230 may be configured to facilitate communication between various host devices 110 such as by reading data from a memory location associated with one host device 110 (e.g., a buffer, a DRAM location, or a similar memory location) and writing the data to a memory location associated with another host device 110 (e.g., a buffer, a DRAM location, or a similar memory location). In some implementations, the multi-host communication component 230 may be configured to assign host identifiers (IDs) to the host devices 110 and/or maintain communication queues associated with communications between the host devices 110, such as one or more communication submission queues and/or communication completion queues.

One or more devices or components shown in FIG. 2 may be configured to perform operations described herein, such as one or more operations and/or methods described in connection with FIGS. 3A-5. For example, the controller 130, the memory management component 225, and/or the multi-host communication component 230 may be configured to perform one or more operations and/or methods for the memory device 120.

The number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Additionally, or alternatively, a set of components (e.g., one or more components) shown in FIG. 2 may perform one or more operations described as being performed by another set of components shown in FIG. 2.

FIGS. 3A-3E are diagrams of an example 300 associated with memory commands for multi-host communications. The operations described in connection with FIGS. 3A-3E may be performed by one or more host devices 110 (e.g., the first host device 110a and/or the second host device 110b), one or more components of the one or more host devices 110, the memory device 120, and/or one or more components of the memory device 120, such as the controller 130 and/or one or more components of the controller 130.

Figure 3A:
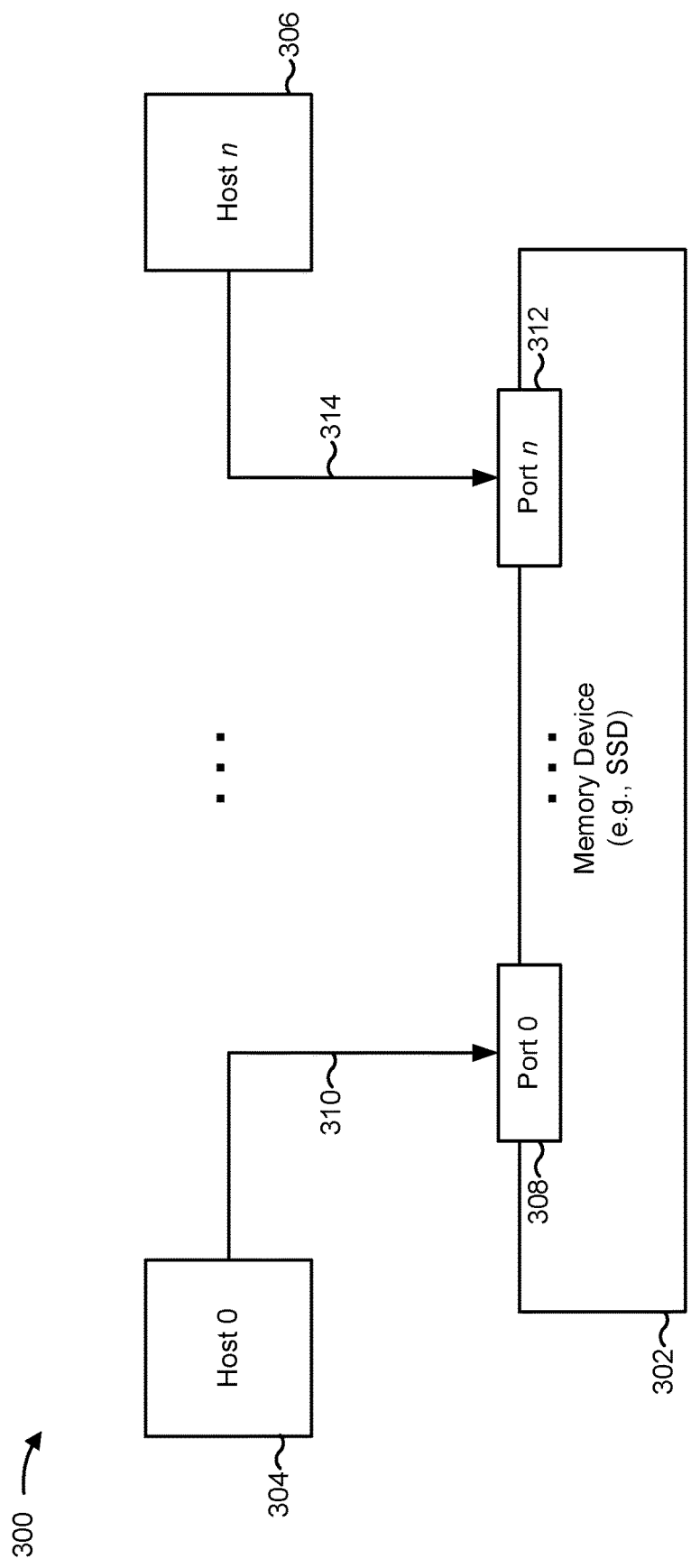
FIGS. 3A-3E are diagrams of an example associated with memory commands for multi-host communications.

As shown in FIG. 3A, some of the operations described herein may include a memory device 302 (e.g., the memory device 120) and one or more connected host devices (e.g., host devices 110), including a first host device 304 (indexed as Host 0 in the example shown in FIGS. 3A-3E) through an n-th host device 306 (indexed as Host n in the example shown in FIGS. 3A-3E, and sometimes referred to as a second host device 306 for ease of discussion). In some implementations, the various host devices 304, 306 may be physical host devices, while, in some other implementations, the various host devices 304, 306 may be virtual host devices.

Moreover, in this implementation, the memory device 302 may be a multi-port memory device (e.g., a multi-port SSD) configured to communicate with the various host devices 304, 306 via respective ports (e.g., via n ports). That is, the memory device 302 may be configured to communicate with the first host device 304 (Host 0) via a first port 308 (indexed as Port 0 in the example shown in FIGS. 3A-3E), and, more particularly, via a first host interface 310 (e.g., first host interface 150a) formed via the first port 308. Similarly, the memory device 302 may be configured to communicate with the second host device 306 (Host n) via a second port 312 (indexed as Port n in the example shown in FIGS. 3A-3E), and, more particularly, via a second host interface 314 (e.g., second host interface 150b) formed via the second port 312. In some other implementations, a memory device may be configured to communicate with multiple host devices via fewer than n ports (e.g., via a single SR-IOV port), which is described in more detail below in connection with FIG. 4. Put another way, in some implementations, the memory devices described herein may be associated with a multi-port SSD (such as the implementation shown in FIGS. 3A-3E), while, in some other implementations, the memory device described herein may be associated with an SR-IOV SSD (such as the implementation shown in FIG. 4), among other examples.

Figure 3B:
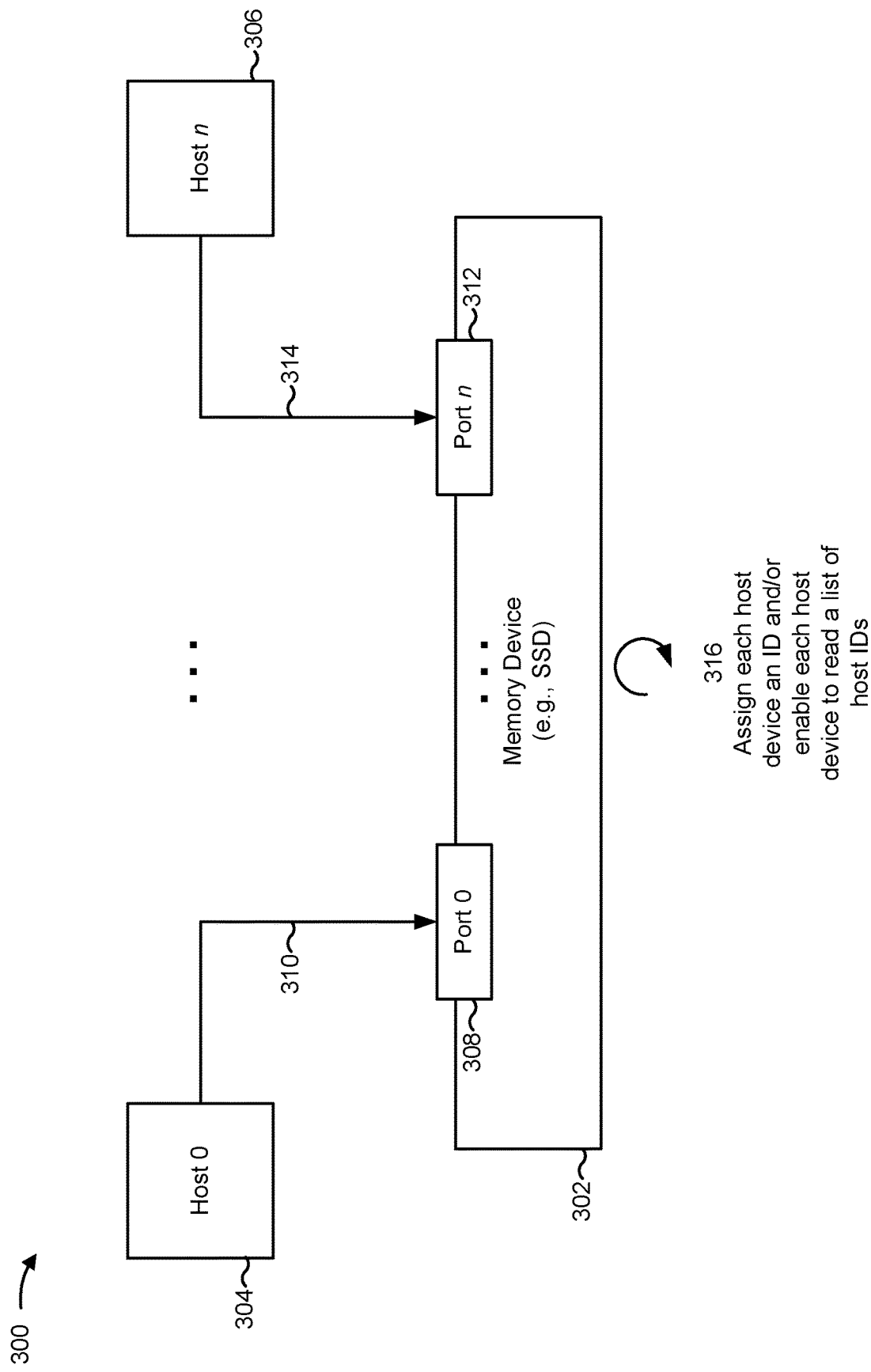

As shown in FIG. 3B, and as indicated by reference number 316, in some implementations, the memory device 302 may be configured to assign each host device 304, 306 a host ID and/or may be configured to enable each host device 304, 306 to read a list of host IDs. Put another way, the memory device 302 and/or one or more components thereof (e.g., the multi-host communication component 230) may be configured to assign a corresponding host ID to each of multiple host devices 304, 306 in communication with the memory device 302. In some implementations, each host device 304, 306 may be configured to read host IDs of all of the connected host devices 304, 306. For example, the memory device 302 may maintain a list of host IDs in a memory location associated with the memory device 120 (e.g., memory 140, non-volatile memory arrays 205, and/or volatile memory arrays 210), which may be a shared memory location by the various host devices 304, 306 or a memory location that is otherwise accessible by each of the host devices 304, 306.

Additionally, or alternatively, the memory device 302 may be configured to enable and/or disable the ability to read the host IDs of all of the connected host devices. Put another way, the memory device 302 and/or one or more components thereof (e.g., the multi-host communication component 230) may be configured to enable and disable an ability of at least one of the first host device 304 or the second host device 306 to read host IDs of the multiple host devices connected to the memory device 302. In this way, the memory device 302 may disable an ability of the first host device 304 and/or the second host device 306 to read host IDs of the multiple host devices, such as for privacy reasons or similar purposes. In contrast, the memory device 302 may enable an ability of the first host device 304 and/or the second host device 306 to read host IDs of the multiple host devices, such as for purposes of facilitating communication between the first host device 304, the second host device 306, and/or other host devices connected to the memory device 302, which is described in more detail below in connection with FIGS. 3C-3E.

Figure 3C:
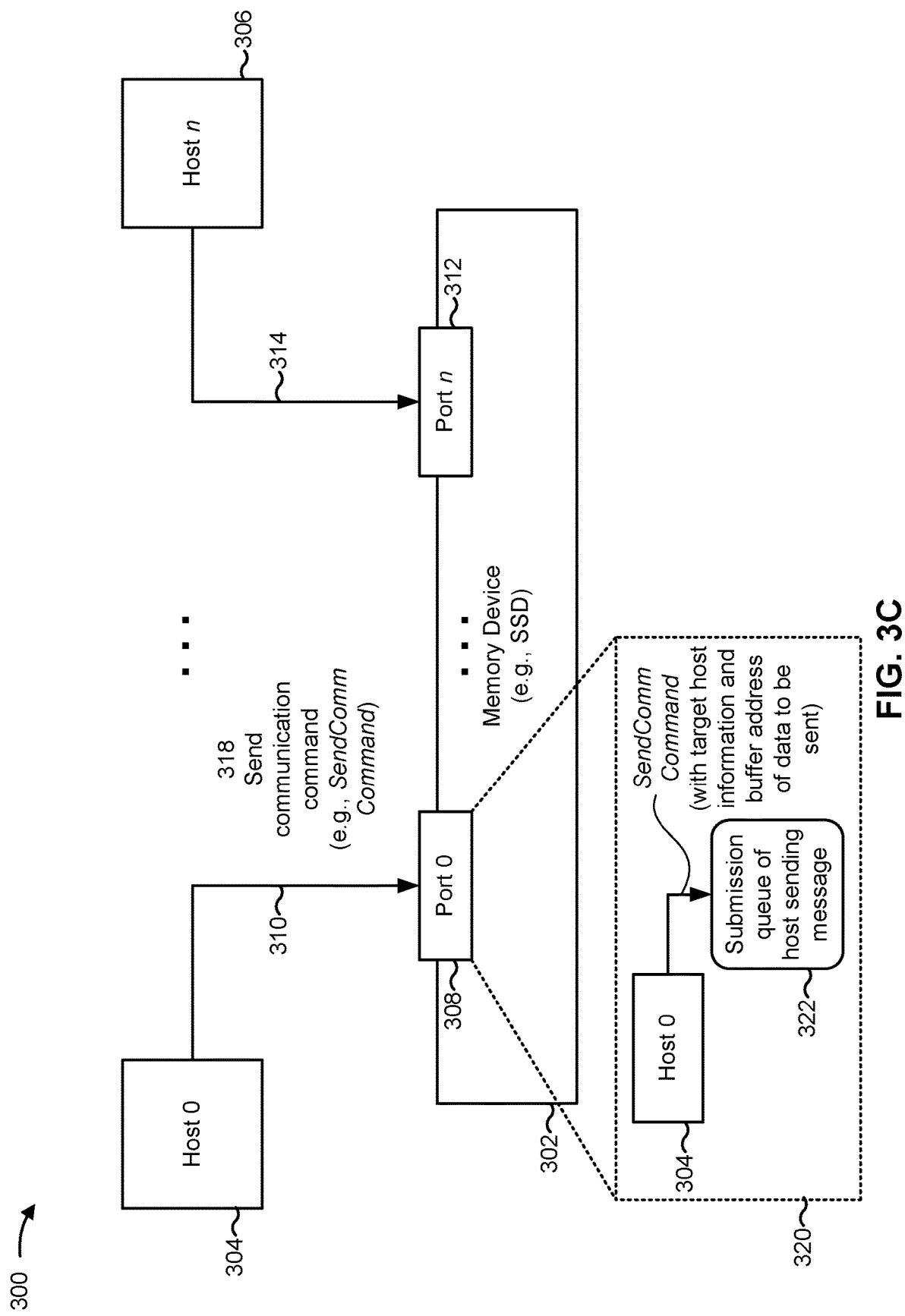

More particularly, as shown in FIG. 3C, and as indicated by reference number 318, in some implementations, the first host device 304 may transmit, and the memory device 302 may receive, a send communication command that instructs the memory device 302 to transmit data from the first host device 304 to the second host device 306. In some implementations, the send communication command may be referred to as a SendComm Command. Additionally, or alternatively, in some implementations, the send communication command may be a vendor specific (VS) command. In that regard, the send communication command may be referred to as a SendComm VS Command.

Additionally, or alternatively, the send communication command may be associated with the NVMe protocol. For example, the send communication command may operate similar to an NVMe write command. At a high level, an NVMe write command may instruct the memory device 302 to retrieve data from a certain location (e.g., a DRAM associated with the host device, or a similar memory location), and write the data to another location (e.g., a NAND associated with the host device, or similar location). Analogously, the send communication command may instruct the memory device 302 to retrieve data (e.g., a message intended for one or more host devices) from a certain location (e.g., a DRAM associated with the first host device 304, a buffer associated with the first host device 304, or a similar memory location), and write the data to another location that is accessible by the second host device 306 (e.g., a DRAM associated with the second host device 306, a buffer associated with the second host device 306, or a similar memory location).

In some implementations, the data indicated by the send communication command may be associated with a unicast message. For example, the data may be associated with a communication between two host devices: the first host device 304 and the second host device 306 in the examples described in connection with FIGS. 3A-3E. In some other implementations, the data may be associated with a multicast message. For example, the data may be associated with a communication intended for multiple host devices (e.g., a group of host devices) that include at least the first host device 304 and the second host device 306. In some other implementations, the data may be associated with a broadcast message. For example, the data may be associated with a communication that is intended for all host devices connected to the memory device 302 and/or any host device connected to the memory device 302 that is configured to receive broadcast messages from other host devices. In that regard, the send communication command may instruct the memory device 302 to transmit data from the first host device 304 to the second host device 306, and, in some implementations (e.g., in the case of a multicast message or a broadcast message), to other host devices as well.

As shown in detail via the broken line box indicated by reference number 320, in some implementations, the send communication command (e.g., the SendComm Command) may indicate target host information and/or a buffer address of data to be sent to each intended host device. For example, the send communication command may indicate the host ID of each intended host device (as assigned to each intended host device via the operations described above in connection with reference number 316) and/or a memory location (e.g., a DRAM location) of the data (e.g., the message) to be transmitted to each intended host device.

Additionally, or alternatively, in some implementations, the first host device 304 may transmit the send communication command (e.g., the SendComm Command) to a submission queue associated with the first host device 304, indicated by reference number 322. In some implementations, the submission queue may be a queue associated with other types of commands, such as an input/output (I/O) queue associated with an NVMe protocol. In some other implementations, the memory device 302 may support one or more dedicated queues associated with communication commands, such as the send communication command described above in connection with reference number 318. For example, in aspects in which the memory device is associated with an NVMe protocol, the memory device 302 may support one or more communication queues in addition to queues traditionally supported by NVMe drives, such as an administrative command queue (sometimes referred to herein as an "Admin queue"), an I/O command queue (sometimes referred to herein as an "I/O queue"), or similar queues. For example, in some implementations, the memory device 302 may support a communication submission queue associated with each host device and/or a communication completion queue associated with each host device. In such implementations, the first host device 304 may be configured to transmit the send communication command to a communication queue (e.g., a communication submission queue) associated with the first host device 304. Put another way, the submission queue shown in connection with reference number 322 may be a dedicated communication submission queue associated with the first host device 304.

Figure 3D:
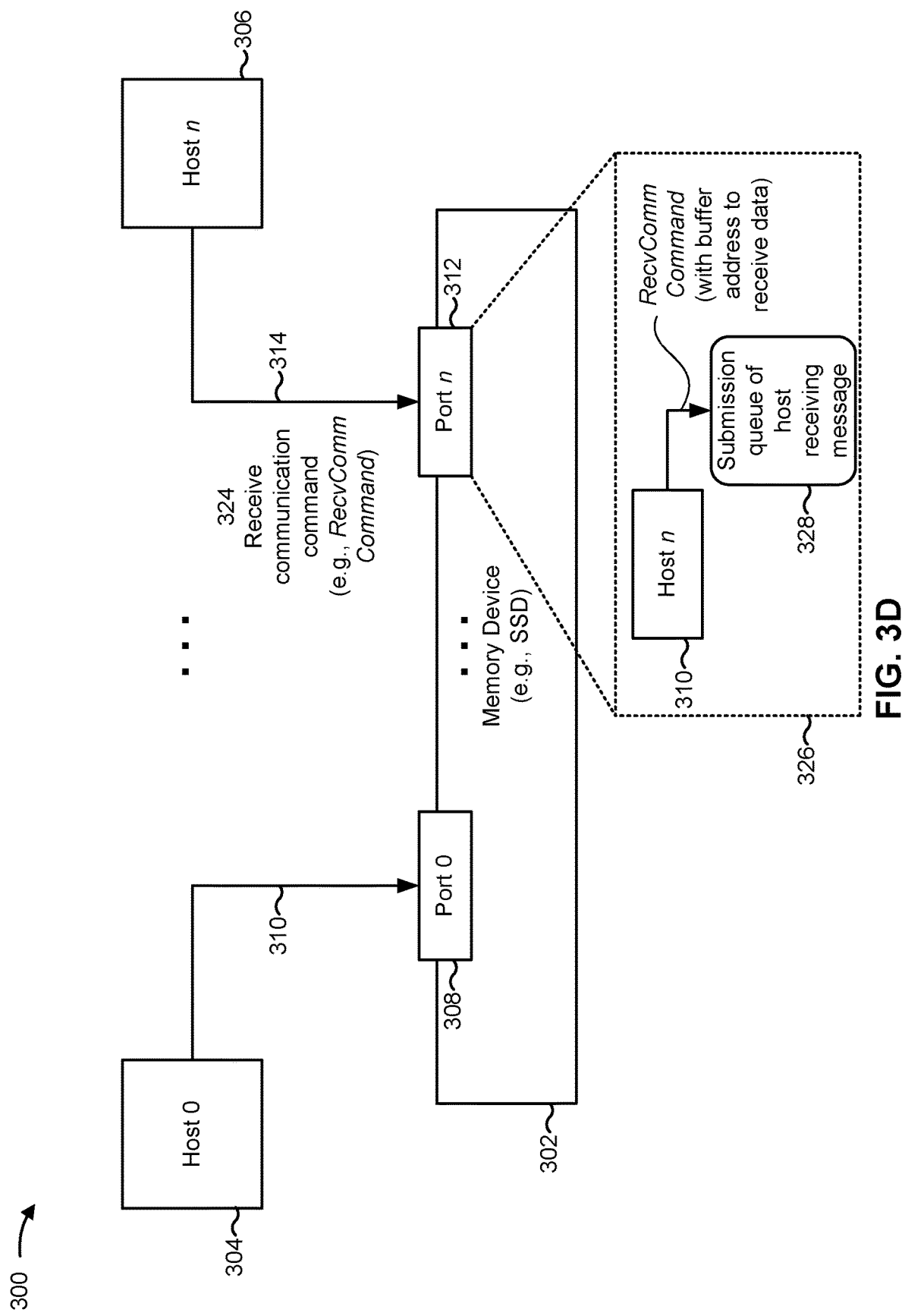

As shown in FIG. 3D, and as indicated by reference number 324, in some implementations, the second host device 306 (e.g., Host n) may transmit, and the memory device 302 may receive, a receive communication command that instructs the memory device 302 to transmit data to the second host device 306 from at least the first host device 304. In some implementations, the receive communication command may be referred to as a RecvComm Command. Additionally, or alternatively, the receive communication command may be a VS command. In that regard, the receive communication command may be referred to as a RecvComm VS Command.

Additionally, or alternatively, the receive communication command may be associated with the NVMe protocol. For example, the receive communication command may operate similar to an NVMe read command. At a high level, an NVMe read command may instruct the memory device 302 to retrieve data from a certain location (e.g., a NAND location, or a similar memory location), and write the data to another location (e.g., a buffer associated with the host device, or similar location). Analogously, the receive communication command may instruct the memory device 302 to retrieve data (e.g., a message intended for the second host device 306) from a certain location (e.g., a DRAM associated with the first host device 304, a buffer associated with the first host device 304, or a similar memory location), and write the data to another location that is accessible by the second host device 306 (e.g., a DRAM associated with the second host device 306, a buffer associated with the second host device 306, or a similar memory location).

As shown in detail via the broken line box indicated by reference number 326, in some implementations, the receive communication command (e.g., the RecvComm Command) may indicate a buffer address of a location to receive data (e.g., a message from the first host device 304). For example, the receive communication command may indicate a memory location (e.g., a DRAM location) to which the data intended for the second host device 306 (e.g., the message being received from the first host device 304) should be written. Additionally, or alternatively, in some implementations, the second host device 306 may transmit the receive communication command (e.g., the RecvComm Command) to a submission queue associated with the second host device 306, indicated by reference number 328. Similar to the submission queue described above in connection with reference number 322, the submission queue may be a queue associated with other types of commands, such as an I/O queue associated with an NVMe protocol. In some other implementations, the submission queue may be a dedicated communication queue. For example, as described above in connection with FIG. 3C, the memory device 302 may support a communication submission queue associated with each host device and/or a communication completion queue associated with each host device. In such implementations, the second host device 306 may be configured to transmit the receive communication command to a communication queue (e.g., a communication submission queue) associated with the second host device 306. Put another way, the submission queue shown in connection with reference number 328 may be a dedicated communication submission queue associated with the second host device 306.

In some aspects, transmission of the send communication command by the first host device 304 and transmission of the receive communication command by the second host device 306 may be asynchronous and/or nondeterministic.

Put another way, the first host device 304 may transmit the send communication command without knowledge of whether the second host device 306 has transmitted a receive communication command, and/or the second host device 306 may transmit a receive communication command without knowledge of whether the first host device 304 has transmitted a send communication command (e.g., the second host device 306 may transmit the receive communication command without knowledge of whether another host device has a message to be transmitted to the second host device 306). Accordingly, to ensure that a receiving host device (e.g., the second host device 306 in the example 300) does not miss any data packets, a receiving host device may maintain at least one receive communication command (e.g., at least one RecvComm Command) in a submission queue at all times. Put another way, in the example shown in FIG. 3D, the second host device 306 may always maintain a receive communication command in the submission queue shown in connection with reference number 328 such that, when another host device has a message to transmit to the second host device 306 (such as the message initiated by the first host device 304 transmitting the send communication command to the submission queue shown in connection with reference number 322), the send host device 306 will receive the message according to the receive communication command. Similarly, in some implementations, a receiving host device (e.g., the second host device 306 in the example 300) may be configured to refrain from timing out the receive communication command. In this way, the receive communication command may remain active in the submission queue such that, if another host device has a message to transmit to the receiving host device, there is an active receive communication command.

Figure 3E:
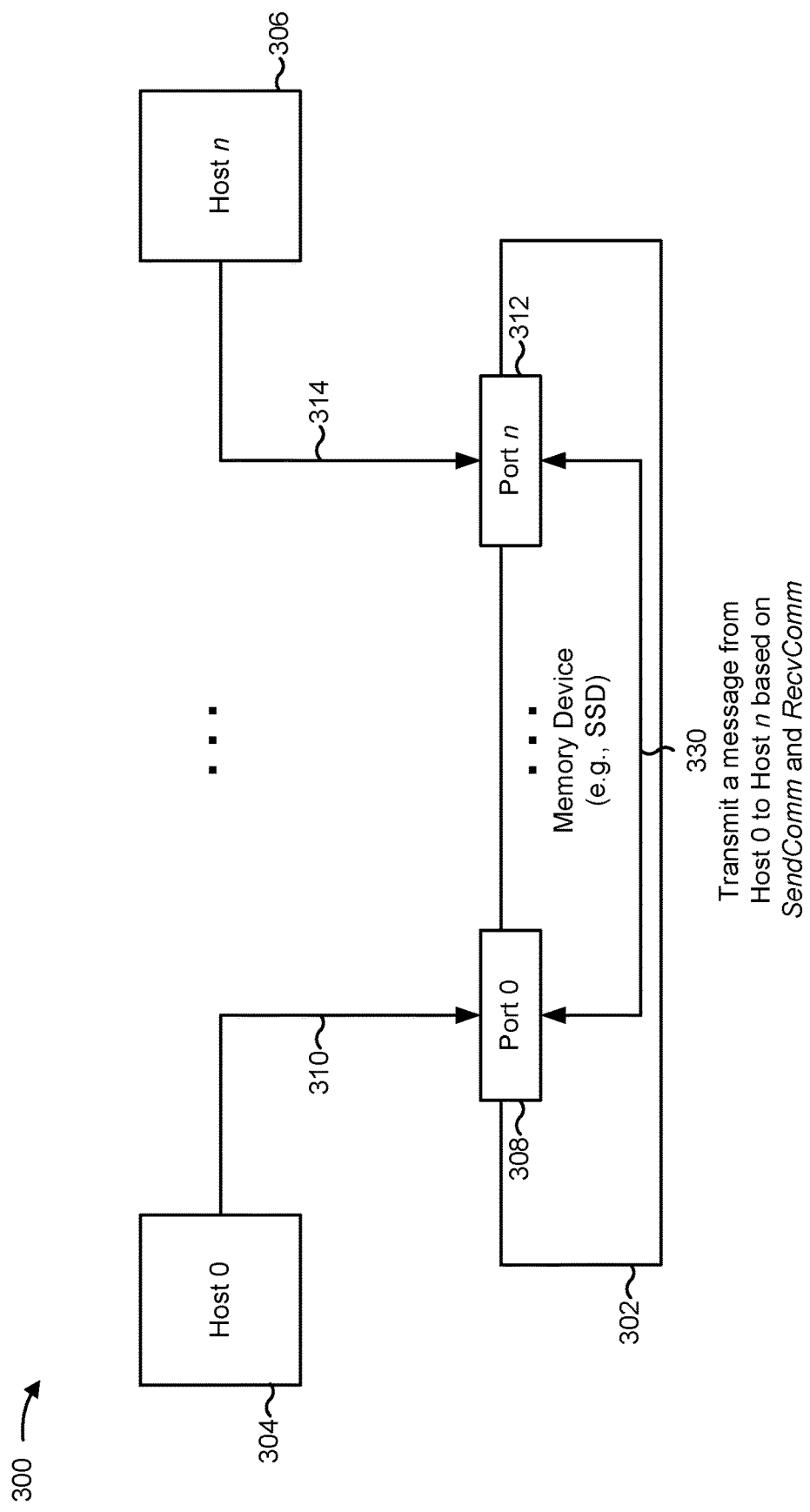

As shown by FIG. 3E, and as indicated by reference number 330, the memory device 302 may be configured to transmit a message from the first host device 304 to the second host device 306 based on the send communication command and the receive communication command. More particularly, the memory device 302 may be configured to read data (e.g., the message to be sent) from a first buffer location (e.g., a DRAM location) associated with the first host device 304 as indicated by the send communication command, and write the data (e.g., the message) to a second buffer location (e.g., a DRAM location) associated with the second host device 306 as indicated by the receive communication command. Moreover, as described above in connection with FIG. 3C, in some implementations the message may be associated with one of a unicast message, a multicast message, or a broadcast message. In implementations in which the message is associated with the unicast message, the memory device 302 may be configured to transmit the message from the first host device 304 to only the second host device 306 based on the send communication command and the receive communication command. In implementations in which the message is associated with a groupcast message, the memory device 302 may be configured to transmit the message from the first host device 304 to a group of host devices based on the send communication command and respective receive communication commands associated with each host device of the group of host devices. In implementations in which the message is associated with a broadcast message, the memory device 302 may be configured to transmit the message from the first host device 304 to any host device configured to receive broadcast messages based on the send communication command and respective receive communication commands associated with each host device. In this way, the first host device 304 may be configured to communicate with the second host device 306 and/or additional host devices even absent a wireless communication link between the host devices, such as even in the absence of a TCP/IP connection or similar link.

In some implementations, as part of the operations shown in connection with reference number 330, the memory device 302 may be configured to move one or more commands to a completion queue or a similar queue. For example, in implementations in which the memory device 302 and the host devices 304, 306 utilize dedicated communication queues (e.g., queues in addition to I/O queues and/or Admin queues), after writing the data (e.g., the message) to the buffer associated with the second host device 306, the memory device 302 may move the send communication command from a communication submission queue associated with the first host device 304 to a communication completion queue associated with the first host device 304, and/or the memory device 302 may move the receive communication command from a communication submission queue associated with the second host device 306 to a communication completion queue associated with the second host device 306.

In some implementations, a host device implementing the communication features described above in connection with FIGS. 3A-3E may not need to limit a number of communication requests to a limit provided by the memory device 302, but instead the host device may use the full capabilities of the host buffer (e.g., the host DRAM) and the total queue depth allowed by the memory device 302. Similarly, in some implementations, the memory device 302 may not need to dedicate a buffer for the communications between host devices, but instead the memory device 302 may use available SRAM, DRAM, and/or cache buffer associated with the memory device 302 for the communications. Moreover, in some implementations, a host device may not need to wait for a buffer to free up from the host device's prior communication commands, but instead the host device may use any available DRAM memory to submit a communication request. Additionally, in some implementations, a host device may not need to rely on the memory device 302 to determine a priority associated with communication commands (e.g., send communication commands and/or receive communication commands), but instead a host device may itself determine the priority of the communication command versus any other I/O and/or administrative operation by setting the priority of the queue that host device uses for the communication.

In some implementations, multiple host devices 304, 306 and/or a memory device 302 implementing the communication features described above in connection with FIGS. 3A-3E may enable communication between the host devices connected to multi-port memory devices (as described above in connection with example 300) and/or SR-IOV enabled memory devices (as is described in more detail below in connection with FIG. 4). Moreover, implementing the communication features described above in connection with FIGS. 3A-3E may enable parallelism in the communication and/or may enable more control for the host device to determine a number of communications and/or priority of communications over any other I/O or administrative commands. Implementing the communication features described above in connection with FIGS. 3A-3E may require no extra interrupt and/or register requirements other than those already existent for NVMe I/O or administrative commands, resulting in reuse of existing infrastructure to implement the various communication features described above.

Although the communication features described above in connection with FIGS. 3A-3E are described in connection with a multi-port memory device 302, implementations of the disclosure are not so limited. In some other implementations, a memory device may be configured to communicate with multiple host devices via fewer ports (e.g., via single SR-IOV port), which is described in more detail below in connection with FIG. 4.

As indicated above, FIGS. 3A-3E are provided as an example. Other examples may differ from what is described with regard to FIGS. 3A-3E.

Figure 4:
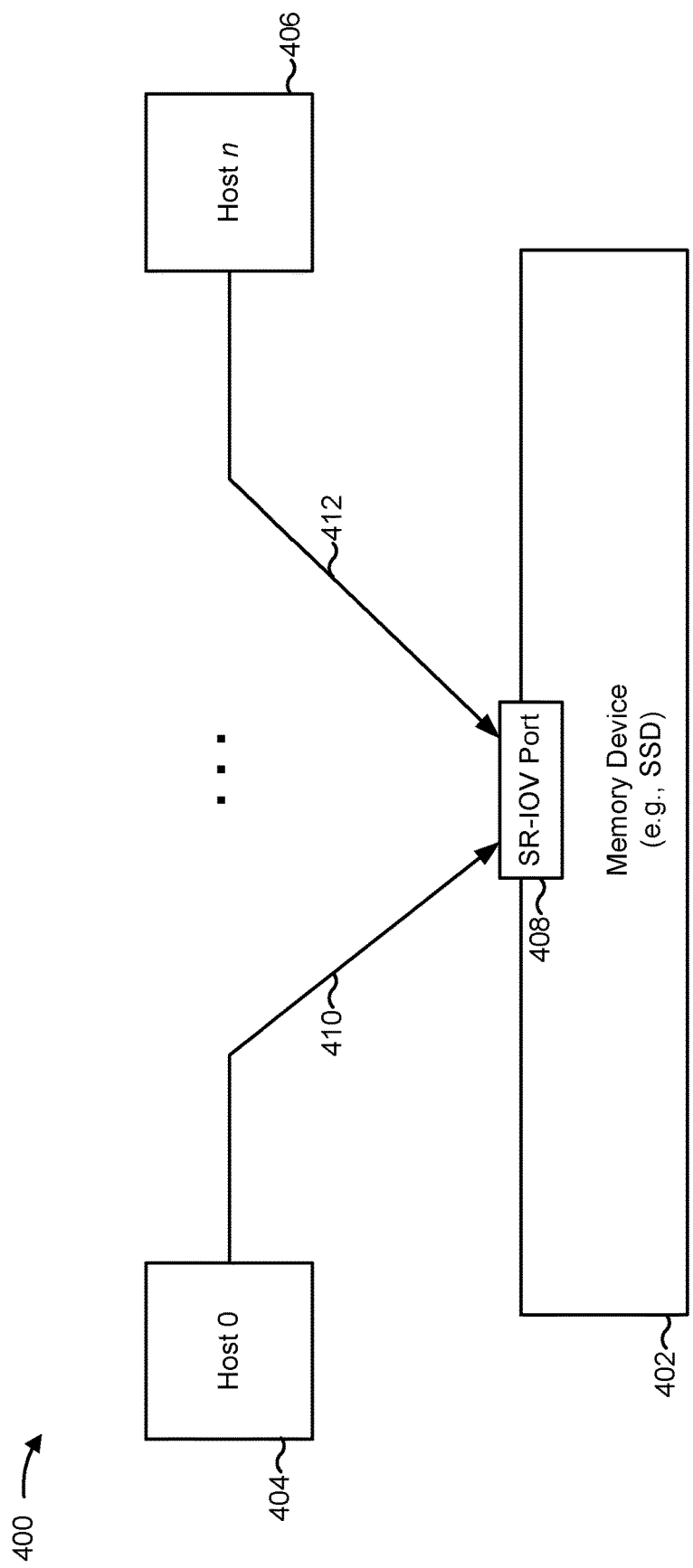
FIG. 4 is a diagram of an example associated with memory commands for multi-host communications.

FIG. 4 is a diagram of an example 400 associated with memory commands for multi-host communications. The operations described in connection with FIG. 4 may be performed by one or more host devices 110 (e.g., the first host device 110a and/or the second host device 110b), one or more components of the one or more host devices 110, the memory device 120, and/or one or more components of the memory device 120, such as the controller 130 and/or one or more components of the controller 130.

In the shown in FIG. 4, some of the operations described herein may include a memory device 402 (e.g., the memory device 120) and one or more host devices (e.g., host devices 110), including a first host device 406 (indexed as Host 0 in the example shown in FIG. 4) through an n-th host device 406 (indexed as Host n in the example shown in FIG. 4, and sometimes referred to as a second host device 406 for ease of discussion). In some implementations, the various host devices 404, 406 may be physical host devices, while, in some other implementations, the various host devices 404, 406 may be virtual host devices.

Moreover, in this implementation, the memory device 402 may be an SR-IOV memory device (e.g., an SR-IOV SSD). In such implementations, the memory device 402 may be configured to communicate with multiple host devices using less than one dedicated I/O port for each host device. More particularly, in the example shown in FIG. 4, the memory device 402 may be configured to communicate with both the first host device 404 and the second host device 406 via an SR-IOV port 408. That is, the memory device 402 may be configured to communicate with the first host device 404 (Host 0) via the SR-IOV port 408, and, more particularly, via a first host interface 410 (e.g., first host interface 150a) formed via the SR-IOV port 408. Similarly, the memory device 402 may be configured to also communicate with the second host device 406 (Host n) via the SR-IOV port 408, and, more particularly, via a second host interface 412 (e.g., second host interface 150b) formed via the SR-IOV port 408.

In such implementations, the memory device 402 may be configured to receive, from the host devices 404, 406, send communication commands and/or receive communication commands via the SR-IOV port 408, in a similar manner as described above in connection with FIGS. 3B-3E. For example, in some implementations, the memory device 402 may be configured to receive, from the first host device 404 (e.g., via the first host interface 410 formed at the SR-IOV port 408), a send communication command instructing the memory device 402 to transmit data from the first host device 404 to at least the second host device 406. Moreover, the memory device 402 may be configured to receive, from the second host device 406 (e.g., via the second host interface 412 formed at the SR-IOV port 408), a receive communication command instructing the memory device 402 to transmit data to the second host device 406 from at least the first host device 404. Accordingly, based on the send communication command and the receive communication command, the memory device 402 may be configured to transmit a message from the first host device 404 to the second host device 406, in a similar manner as described above in connection with FIG. 3E.

As indicated above, FIG. 4 is provided as an example. Other examples may differ from what is described with regard to FIG. 4.

Figure 5:
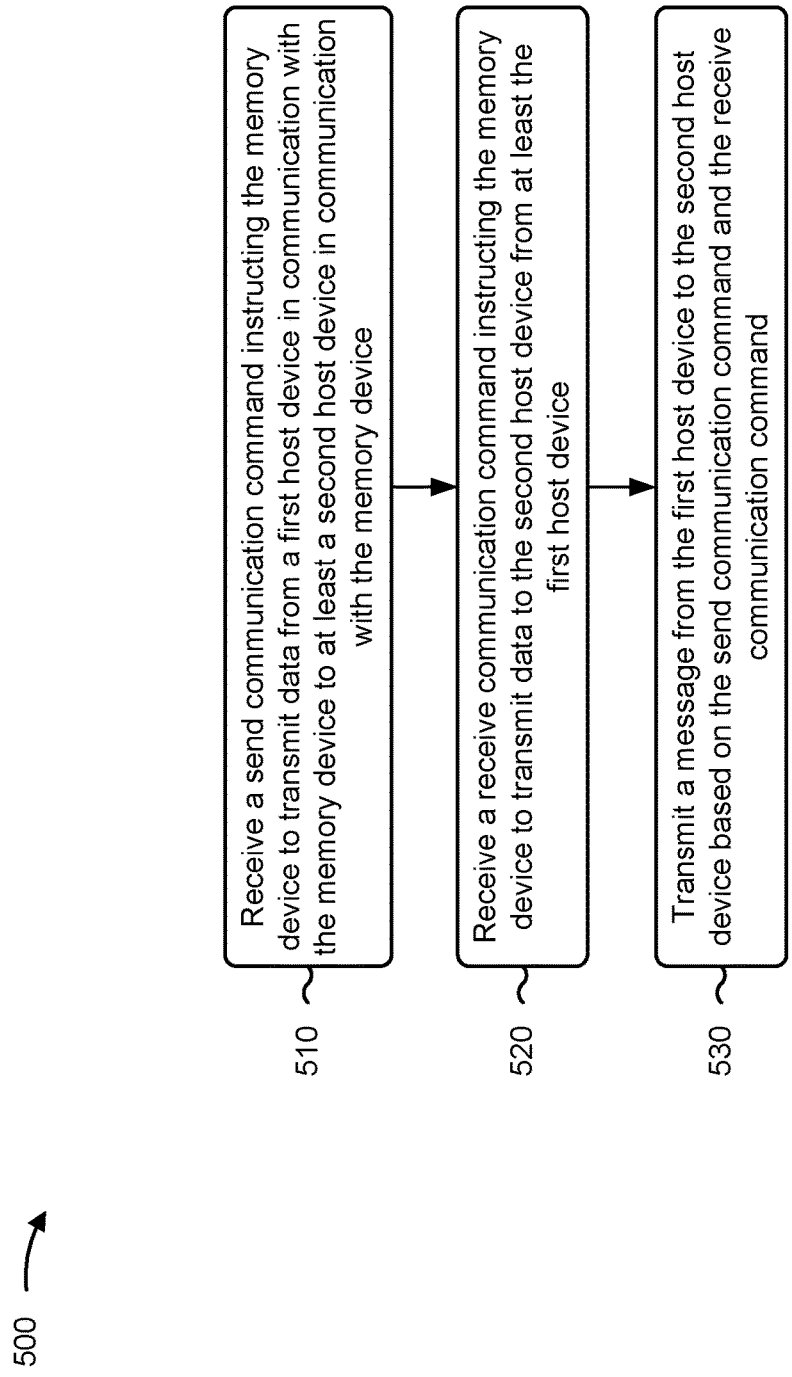
FIG. 5 is a flowchart of an example method associated with memory commands for multi-host communications.

FIG. 5 is a flowchart of an example method 500 associated with memory commands for multi-host communications. In some implementations, a memory device (e.g., the memory device 120, the memory device 302, and/or the memory device 402) may perform or may be configured to perform the method 500. In some implementations, another device or a group of devices separate from or including the memory device (e.g., the system 100) may perform or may be configured to perform the method 500. Additionally, or alternatively, one or more components of the memory device (e.g., the controller 130, the memory management component 225, and/or the multi-host communication component 230) may perform or may be configured to perform the method 500. Thus, means for performing the method 500 may include the memory device and/or one or more components of the memory device. Additionally, or alternatively, a non-transitory computer-readable medium may store one or more instructions that, when executed by the memory device (e.g., the controller 130 of the memory device 120), cause the memory device to perform the method 500.

As shown in FIG. 5, the method 500 may include receiving a send communication command instructing the memory device to transmit data from a first host device in communication with the memory device to at least a second host device in communication with the memory device (block 510). As further shown in FIG. 5, the method 500 may include receiving a receive communication command instructing the memory device to transmit data to the second host device from at least the first host device (block 520). As further shown in FIG. 5, the method 500 may include transmitting a message from the first host device to the second host device based on the send communication command and the receive communication command (block 530).

The method 500 may include additional aspects, such as any single aspect or any combination of aspects described below and/or described in connection with one or more other methods or operations described elsewhere herein.

In a first aspect, the send communication command and the receive communication command are associated with an NVMe protocol.

In a second aspect, alone or in combination with the first aspect, the message is associated with one of a unicast message, a multicast message, or a broadcast message.

In a third aspect, alone or in combination with one or more of the first and second aspects, the memory device is associated with one of a multi-port SSD or an SR-IOV SSD.

In a fourth aspect, alone or in combination with one or more of the first through third aspects, the memory device is associated with at least one communication queue for receiving at least one of the send communication command or the receive communication command.

In a fifth aspect, alone or in combination with one or more of the first through fourth aspects, the method 500 includes assigning, by the memory device, a corresponding host ID to each of multiple host devices in communication with the memory device.

In a sixth aspect, alone or in combination with one or more of the first through fifth aspects, the method 500 includes enabling an ability of at least one of the first host device or the second host device to read host IDs of the multiple host devices.

In a seventh aspect, alone or in combination with one or more of the first through sixth aspects, the send communication command is a VS send communication command, and the receive communication command is a VS receive communication command.

Although FIG. 5 shows example blocks of a method 500, in some implementations, the method 500 may include additional blocks, fewer blocks, different blocks, or differently arranged blocks than those depicted in FIG. 5. Additionally, or alternatively, two or more of the blocks of the method 500 may be performed in parallel. The method 500 is an example of one method that may be performed by one or more devices described herein. These one or more devices may perform or may be configured to perform one or more other methods based on operations described herein.

In some implementations, a memory device includes one or more components configured to: receive, from a first host device in communication with the memory device, a send communication command instructing the memory device to transmit data from the first host device to at least a second host device in communication with the memory device; receive, from the second host device, a receive communication command instructing the memory device to transmit data to the second host device from at least the first host device; and transmit a message from the first host device to the second host device based on the send communication command and the receive communication command.

In some implementations, a method includes receiving, by a memory device from a first host device in communication with the memory device, a send communication command instructing the memory device to transmit data from the first host device to at least a second host device in communication with the memory device; receiving, by the memory device from the second host device, a receive communication command instructing the memory device to transmit data to the second host device from at least the first host device; and transmitting, by the memory device, a message from the first host device to the second host device based on the send communication command and the receive communication command.

In some implementations, a system includes a first host device configured to: transmit, to a memory device, a send communication command instructing the memory device to transmit data from the first host device to at least a second host device; a second host device configured to: transmit, to the memory device, a receive communication command instructing the memory device to transmit data to the second host device from at least the first host device; and the memory device configured to: facilitate communication between the first host device and the second host device by transmitting a message from the first host device to the second host device based on the send communication command and the receive communication command.

The foregoing disclosure provides illustration and description but is not intended to be exhaustive or to limit the implementations to the precise forms disclosed. Modifications and variations may be made in light of the above disclosure or may be acquired from practice of the implementations described herein.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A memory device, comprising:
one or more components configured to:
receive, from a first host device in communication with the memory device, a send communication command instructing the memory device to transmit data from the first host device to at least a second host device in communication with the memory device;
receive, from the second host device, a receive communication command instructing the memory device to transmit data to the second host device from at least the first host device;
transmit a message from the first host device to the second host device based on the send communication command and the receive communication command; and
enable an ability of at least one of the first host device or the second host device to read host identifiers (IDs).

2. The memory device of claim 1, wherein the send communication command and the receive communication command are associated with a non-volatile memory express (NVMe) protocol.

3. The memory device of claim 1, where the message is associated with one of a unicast message, a multicast message, or a broadcast message.

4. The memory device of claim 1, wherein the memory device is associated with one of a multi-port solid state drive (SSD) or a single root input/output virtualization (SR-IOV) SSD.

5. The memory device of claim 1, wherein the memory device is associated with at least one communication queue for receiving at least one of the send communication command or the receive communication command.

6. The memory device of claim 1, wherein the one or more components are further configured to assign a corresponding host ID to each of multiple host devices in communication with the memory device.

7. The memory device of claim 6, wherein the one or more components are further configured to disable the ability of the at least one of the first host device or the second host device to read the host IDs.

8. The memory device of claim 1, wherein the send communication command is a vendor specific (VS) send communication command, and wherein the receive communication command is a VS receive communication command.

9. A method, comprising:
receiving, by a memory device from a first host device in communication with the memory device, a send communication command instructing the memory device to transmit data from the first host device to at least a second host device in communication with the memory device;
receiving, by the memory device from the second host device, a receive communication command instructing the memory device to transmit data to the second host device from at least the first host device;
transmitting, by the memory device, a message from the first host device to the second host device based on the send communication command and the receive communication command; and
enabling, by the memory device, an ability of at least one of the first host device or the second host device to read host identifiers (IDs).

10. The method of claim 9, wherein the send communication command and the receive communication command are associated with a non-volatile memory express (NVMe) protocol.

11. The method of claim 9, where the message is associated with one of a unicast message, a multicast message, or a broadcast message.

12. The method of claim 9, wherein the memory device is associated with one of a multi-port solid state drive (SSD) or a single root input/output virtualization (SR-IOV) SSD.

13. The method of claim 9, wherein the memory device is associated with at least one communication queue for receiving at least one of the send communication command or the receive communication command.

14. The method of claim 9, further comprising assigning, by the memory device, a corresponding host ID to each of multiple host devices in communication with the memory device.

15. The method of claim 14, further comprising disabling the ability of the at least one of the first host device or the second host device to read the host IDs.

16. The method of claim 9, wherein the send communication command is a vendor specific (VS) send communication command, and wherein the receive communication command is a VS receive communication command.

17. A system, comprising:
a first host device configured to:
transmit, to a memory device, a send communication command instructing the memory device to transmit data from the first host device to at least a second host device;
the second host device configured to:
transmit, to the memory device, a receive communication command instructing the memory device to transmit data to the second host device from at least the first host device; and
the memory device configured to:
facilitate communication between the first host device and the second host device by transmitting a message from the first host device to the second host device based on the send communication command and the receive communication command; and
enable an ability of at least one of the first host device or the second host device to read host identifiers (IDs).

18. The system of claim 17, wherein the second host device is configured to maintain at least one receive communication command in a submission queue associated with the receive communication command.

19. A system, comprising:
a first host device configured to:
transmit, to a memory device, a send communication command instructing the memory device to transmit data from the first host device to at least a second host device;
the second host device configured to:
transmit, to the memory device, a receive communication command instructing the memory device to transmit data to the second host device from at least the first host device, wherein the second host device is configured to refrain from timing out the receive communication command; and
the memory device configured to:
facilitate communication between the first host device and the second host device by transmitting a message from the first host device to the second host device based on the send communication command and the receive communication command.

20. The system of claim 17, wherein the first host device is configured to transmit the send communication command to a communication queue associated with the first host device, and wherein the second host device is configured to transmit the receive communication command to a communication queue associated with the second host device.

* * * * *